(12) United States Patent
Davis et al.

(10) Patent No.: US 11,268,442 B2
(45) Date of Patent: Mar. 8, 2022

(54) MID MOUNT SLEEVE ARRANGEMENT

(71) Applicant: Raytheon Technologies Corporation, Farmington, CT (US)

(72) Inventors: Todd A. Davis, Tolland, CT (US); Paul R. Hanrahan, Farmington, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 49 days.

(21) Appl. No.: 16/918,225

(22) Filed: Jul. 1, 2020

(65) Prior Publication Data

US 2022/0003164 A1 Jan. 6, 2022

(51) Int. Cl.
*F02C 7/06* (2006.01)
*F02C 7/36* (2006.01)
*F01D 25/16* (2006.01)
*F02C 7/28* (2006.01)

(52) U.S. Cl.
CPC .............. *F02C 7/06* (2013.01); *F01D 25/162* (2013.01); *F02C 7/28* (2013.01); *F02C 7/36* (2013.01); *F05D 2220/32* (2013.01); *F05D 2240/54* (2013.01); *F05D 2240/55* (2013.01); *F05D 2240/60* (2013.01)

(58) Field of Classification Search
CPC ......... F01D 25/16; F01D 25/162; F01D 5/026; F01D 25/125; F01D 5/066; F01D 9/065; F16C 2360/23; F16C 27/04; F16C 35/067; F16C 35/073; F16C 19/55; F16C 35/045; F16C 25/083; F04D 29/054; F02C 7/36; F02C 7/06; F02C 7/28; F05D 2220/32; F05D 2230/64; F05D 2240/54; F05D 2240/50; F05D 2240/55; F05D 2240/60; F05D 2260/30; Y10S 384/906
See application file for complete search history.

(56) References Cited

U.S. PATENT DOCUMENTS

| | | | |
|---|---|---|---|
| 2,866,522 A | 12/1958 | Morley et al. | |
| 3,602,535 A | * 8/1971 | Behning | F01D 5/026 403/118 |
| 4,693,616 A | 9/1987 | Rohra et al. | |
| 6,142,729 A | 11/2000 | Tran et al. | |

(Continued)

OTHER PUBLICATIONS

European Search Report for European Application No. 21183201.9; dated Dec. 1, 2021; 10 pages.

*Primary Examiner* — J. Todd Newton
*Assistant Examiner* — Eric J Zamora Alvarez
(74) *Attorney, Agent, or Firm* — Cantor Colburn LLP

(57) ABSTRACT

A shaft and sleeve assembly of a gas turbine engine includes an outer shaft extending about an engine central longitudinal axis and having a radially inner shaft surface. The radially inner shaft surface has a shaft groove define therein. A sleeve is located radially inboard of the radially inner shaft surface. The sleeve includes a sleeve groove defined in a radially outer sleeve surface. The sleeve groove is formed at an axial location between a first axial end and a second axial end of the sleeve. A retaining element is installed in the shaft groove and the sleeve groove to retain the sleeve relative to the outer shaft. The sleeve includes one or more sleeve openings formed therein, and the sleeve groove is aligned with the one or more sleeve openings.

18 Claims, 2 Drawing Sheets

(56) References Cited

U.S. PATENT DOCUMENTS

| | | | |
|---|---|---|---|
| 6,579,010 B2 * | 6/2003 | Trapp | F01D 25/16 |
| | | | 384/537 |
| 7,128,529 B2 * | 10/2006 | Le Jeune | F01D 5/025 |
| | | | 415/229 |
| 7,811,052 B2 * | 10/2010 | Guihard | F01D 5/026 |
| | | | 415/122.1 |
| 8,794,922 B2 * | 8/2014 | Bart | F01D 25/162 |
| | | | 416/170 R |
| 8,840,114 B2 | 9/2014 | Dixon et al. | |
| 9,784,130 B2 * | 10/2017 | Brault | F02C 7/36 |
| 10,577,959 B2 | 3/2020 | Bokhorst et al. | |
| 2007/0177936 A1 | 8/2007 | Servant | |
| 2012/0076657 A1 | 3/2012 | Ress, Jr. | |

* cited by examiner

MID MOUNT SLEEVE ARRANGEMENT

BACKGROUND

Exemplary embodiments of the present disclosure pertain to the art of gas turbine engines, and in particular to rotating systems of gas turbine engines.

Engine architecture dictates where bearings and supports can be located to properly support the rotors, in an attempt to establish a compromise between key engine metrics. (Weight, cost, performance, engine length, part count, tip closures, etc). As engine sizes decrease some features are not photographically scalable—thereby requiring unique features to facilitate the implementation of key structures. Combining bearing compartments and having intershaft bearing compartments is one such example. As engines spin faster, the bearing bore sizes must be decreased to reduce the relative surface speed to within acceptable levels. This can be a packaging challenge in areas that also have shafts passing underneath the bearing, as shaft diameters are optimized for maximum diameters for stiffness and strength considerations. Therefore it would be desirable to have fastening features that can result in lower bearing stresses and lighter weight arrangements.

BRIEF DESCRIPTION

In one embodiment, a shaft and sleeve assembly of a gas turbine engine includes an outer shaft extending about an engine central longitudinal axis and having a radially inner shaft surface. The radially inner shaft surface has a shaft groove define therein. A sleeve is located radially inboard of the radially inner shaft surface. The sleeve includes a sleeve groove defined in a radially outer sleeve surface. The sleeve groove is formed at an axial location between a first axial end and a second axial end of the sleeve. A retaining element is installed in the shaft groove and the sleeve groove to retain the sleeve relative to the outer shaft. The sleeve includes one or more sleeve openings formed therein, and the sleeve groove is aligned with the one or more sleeve openings.

Additionally or alternatively, in this or other embodiments an axial stop is formed in the radially inner shaft surface at which one of the first axial end or the second axial end of the sleeve are located.

Additionally or alternatively, in this or other embodiments the retaining element is installable and/or removable via the one or more sleeve openings.

Additionally or alternatively, in this or other embodiments the retaining element is one of a ring, a split ring or a wire.

Additionally or alternatively, in this or other embodiments an inner shaft is located radially inboard of the sleeve.

Additionally or alternatively, in this or other embodiments the sleeve includes a rub strip is located at a radially inboard surface of the sleeve. The rub strip is interactive with one or more sealing features of the inner shaft.

Additionally or alternatively, in this or other embodiments the inner shaft is a low pressure turbine shaft.

Additionally or alternatively, in this or other embodiments the inner shaft and the outer shaft are each configured for independent rotation about the engine central longitudinal axis.

Additionally or alternatively, in this or other embodiments the outer shaft is a high pressure turbine of the gas turbine engine.

In another embodiment, a gas turbine engine includes a combustor and a turbine section driven by combustion gasses of the combustor. The turbine section includes an outer shaft extending about an engine central longitudinal axis and having a radially inner shaft surface. The radially inner shaft surface has a shaft groove define therein. A sleeve is located radially inboard of the radially inner shaft surface. The sleeve includes a sleeve groove defined in a radially outer sleeve surface. The sleeve groove is formed at an axial location between a first axial end and a second axial end of the sleeve. A retaining element is installed in the shaft groove and the sleeve groove to retain the sleeve relative to the outer shaft. The sleeve includes one or more sleeve openings formed therein. The sleeve groove is aligned with the one or more sleeve openings.

Additionally or alternatively, in this or other embodiments an axial stop is formed in the radially inner shaft surface at which one of the first axial end or the second axial end of the sleeve are located.

Additionally or alternatively, in this or other embodiments the retaining element is installable and/or removable via the one or more sleeve openings.

Additionally or alternatively, in this or other embodiments the retaining element is one of a ring, a split ring or a wire.

Additionally or alternatively, in this or other embodiments an inner shaft is located radially inboard of the sleeve.

Additionally or alternatively, in this or other embodiments the sleeve includes a rub strip located at a radially inboard surface of the sleeve. The rub strip is interactive with one or more sealing features of the inner shaft.

Additionally or alternatively, in this or other embodiments the inner shaft is a low pressure turbine shaft.

Additionally or alternatively, in this or other embodiments the inner shaft and the outer shaft are each configured for independent rotation about the engine central longitudinal axis.

Additionally or alternatively, in this or other embodiments the outer shaft is a high pressure turbine of the gas turbine engine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
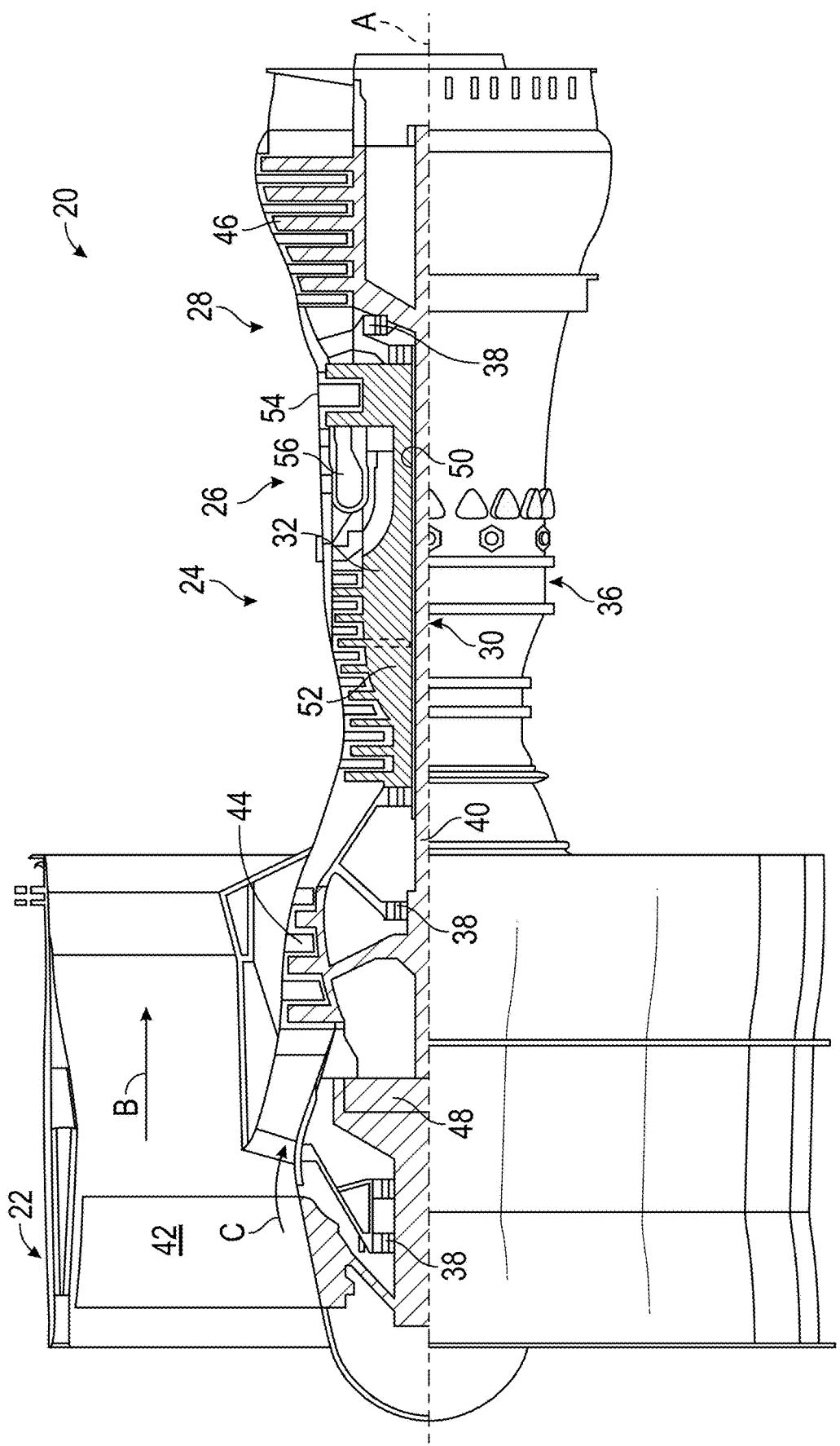
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
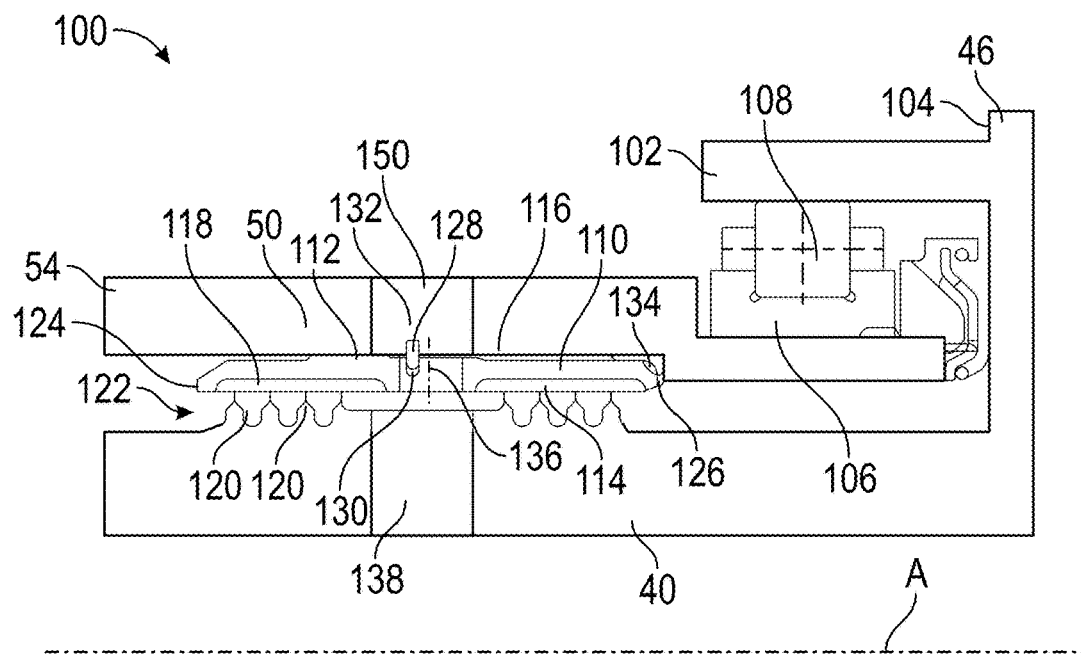
FIG. 2 is a partial cross-sectional view of an embodiment of a bearing assembly of a gas turbine engine.

Referring to FIG. 2 is a cross-sectional illustration of a bearing assembly 100 of a gas turbine engine 20. The bearing assembly 100 in some embodiments is defined radially between two rotating components of the gas turbine engine 20, for example, between the inner shaft 40 and the outer shaft 50 and components of the high pressure turbine 54 and the low pressure turbine 46. In some embodiments, the high pressure turbine 54 and the low pressure turbine 46 rotate in opposite directions about the engine central longitudinal axis A, and in other embodiments the high pressure turbine 54 and the low pressure turbine 46 co-rotate, or rotate the same direction about the engine central longitudinal axis A.

The bearing assembly 100 includes a bearing outer race 102 secured to, for example, a low pressure turbine rotor 104, and a bearing inner race 106 located radially inboard of the bearing outer race 102, and secured at the high pressure turbine 54, for example, at the outer shaft 50. One or more bearing elements 108 are located between the bearing outer race 102 and the bearing inner race 106. Further, the bearing assembly 100 further includes a bore sleeve 110 located radially between the high pressure turbine 54 and the inner shaft 40. The bore sleeve 110 has a bore sleeve outer surface 112 and a bore sleeve inner surface 114 opposite the bore sleeve outer surface 112. The bore sleeve 110 is secured to a high pressure turbine inner surface 116 at the bore sleeve outer surface 112. In some embodiments, the bore sleeve 110 may include sleeve seal elements, such as rub strips 118 which are interactive with corresponding seal elements of the inner shaft 40, such as knife edges 120. The interaction of the rub strips 118 and the knife edges 120 defines a sealing interface 122 between the bore sleeve 110 and the inner shaft 40.

The bore sleeve 100 includes a first axial end 124 and a second axial end 126 opposite the first axial end 124. The bore sleeve 100 is located at and secured to the high pressure turbine inner surface 116 via one or more retaining elements, such as a retaining ring 128. The retaining ring 128 is installed into an circumferentially-extending sleeve groove 130 defined in the bore sleeve outer surface 112 and into a corresponding circumferentially-extending turbine groove 132 formed in the high pressure turbine inner surface 116. The retaining ring 128 thus axially retains the bore sleeve 110 in a selected location relative to the high pressure turbine inner surface 116 and the inner shaft 40. The sleeve groove 130 is located axially between the first axial end 124 and the second axial end 126 of the bore sleeve 110, for example in the lowest stress or most easily accessible location of the bore sleeve 110. In some embodiments, the sleeve groove 130 is located along the middle 50% of the axial distance between the first axial end 124 and the second axial end 126. Further, in some embodiments the high pressure turbine 54 includes an axial stop 134 formed in the high pressure turbine inner surface 116, which abuts one of the first axial end 124 or the second axial end 126.

In some embodiments, the sleeve groove 130 is located at a sleeve opening 136 through which fluid passes for lubrication of the bearing assembly 100. The sleeve opening 136 aligns with an outer shaft opening 150 in the outer shaft 50, and an inner shaft opening 138 in the inner shaft 40, which also allows for fluid passage therethrough for cooling air to circumnavigate the bearing assembly 100. Aligning the sleeve groove 130 with the sleeve opening 136 and the outer shaft opening 150 allows for easy access to the retaining ring 128 for installation and/or removal of the retaining ring 128.

Figure 3:
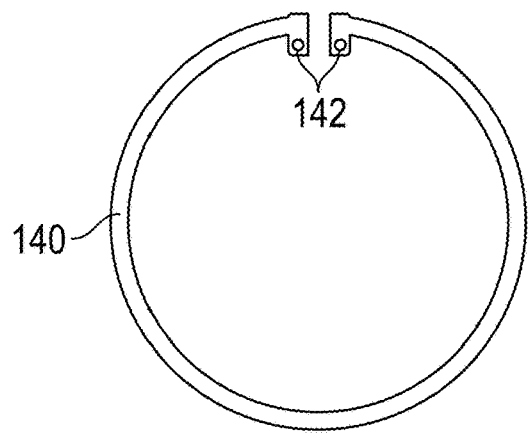
FIG. 3 is a plan view of an embodiment of a retaining element.
Figure 4:
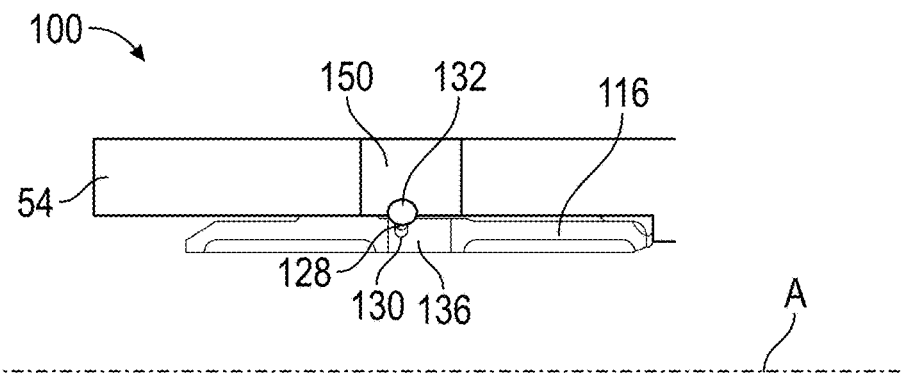
FIG. 4 is a partial cross-sectional view of another embodiment of a bearing assembly of a gas turbine engine.

While a retaining ring 128 is used in some embodiments, other retaining elements may be utilized. For example, in FIG. 3, a retaining clip 140, which is a split ring having clip ears 142, may be utilized. The clip ears 142 may be utilized to compress the retaining clip 140 to allow for disassembly of the bore sleeve 110 from the high pressure turbine 54. In another embodiment, such as shown in FIG. 4, a wire 144 is utilized as the retaining element. The wire 144 may be fed circumferentially along the sleeve groove 130 via the sleeve opening 136 or the outer shaft opening 150.

The configurations disclosed herein allow for positioning of the retaining elements at a selected location of the bore sleeve 110, for example in lower stress locations of the bore sleeve 110 or the high pressure turbine 54. Locating the retaining elements at the lower stress locations thereby allows the high pressure turbine 54 and/or bore sleeve 110 thicknesses or radial heights to be reduced. This results in lower bearing stresses and lower weight of the components.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A shaft and sleeve assembly of a gas turbine engine comprises:
   an outer shaft extending about an engine central longitudinal axis and having a radially inner shaft surface, the radially inner shaft surface having a shaft groove defined therein;
   a sleeve disposed radially inboard of the radially inner shaft surface, the sleeve including a sleeve groove defined in a radially outer sleeve surface, the sleeve groove formed at an axial location between a first axial end and a second axial end of the sleeve; and
   a retaining element installed in the shaft groove and the sleeve groove to retain the sleeve relative to the outer shaft;
   wherein the sleeve includes one or more sleeve openings formed therein; and
   wherein the sleeve groove is aligned with the one or more sleeve openings.

2. The shaft and sleeve assembly of claim 1, further comprising an axial stop formed in the radially inner shaft surface at which one of the first axial end or the second axial end of the sleeve are located.

3. The shaft and sleeve assembly of claim 1, wherein the retaining element is installable and/or removable via the one or more sleeve openings.

4. The shaft and sleeve assembly of claim 1, wherein the retaining element is one of a ring, a split ring or a wire.

5. The shaft and sleeve assembly of claim 1, further comprising an inner shaft disposed radially inboard of the sleeve.

6. The shaft and sleeve assembly of claim 5, wherein the sleeve includes a rub strip disposed at a radially inboard surface of the sleeve, the rub strip interactive with one or more sealing features of the inner shaft.

7. The shaft and sleeve assembly of claim 5, wherein the inner shaft is a low pressure turbine shaft.

8. The shaft and sleeve assembly of claim 5, wherein the inner shaft and the outer shaft are each configured for independent rotation about the engine central longitudinal axis.

9. The shaft and sleeve assembly of claim 1, wherein the outer shaft is a high pressure turbine shaft of the gas turbine engine.

10. A gas turbine engine, comprising:
    a combustor; and
    a turbine section driven by combustion gas of the combustor, the turbine section including:
    an outer shaft extending about an engine central longitudinal axis and having a radially inner shaft surface, the radially inner shaft surface having a shaft groove defined therein;
    a sleeve disposed radially inboard of the radially inner shaft surface, the sleeve including a sleeve groove defined in a radially outer sleeve surface, the sleeve groove formed at an axial location between a first axial end and a second axial end of the sleeve; and
    a retaining element installed in the shaft groove and the sleeve groove to retain the sleeve relative to the outer shaft;
    wherein the sleeve includes one or more sleeve openings formed therein; and
    wherein the sleeve groove is aligned with the one or more sleeve openings.

11. The gas turbine engine of claim 10, further comprising an axial stop formed in the radially inner shaft surface at which one of the first axial end or the second axial end of the sleeve are located.

12. The gas turbine engine of claim 10, wherein the retaining element is installable and/or removable via the one or more sleeve openings.

13. The gas turbine engine of claim 10, wherein the retaining element is one of a ring, a split ring or a wire.

14. The gas turbine engine of claim 10, further comprising an inner shaft disposed radially inboard of the sleeve.

15. The gas turbine engine of claim 14, wherein the sleeve includes a rub strip disposed at a radially inboard surface of the sleeve, the rub strip interactive with one or more sealing features of the inner shaft.

16. The gas turbine engine of claim 14, wherein the inner shaft is a low pressure turbine shaft.

17. The gas turbine engine of claim 14, wherein the inner shaft and the outer shaft are each configured for independent rotation about the engine central longitudinal axis.

18. The gas turbine engine of claim 10, wherein the outer shaft is a high pressure turbine shaft of the gas turbine engine.

\* \* \* \* \*